US009174317B1

(12) United States Patent
Lessway

(10) Patent No.: US 9,174,317 B1
(45) Date of Patent: Nov. 3, 2015

(54) ADJUSTABLE FIXTURE MECHANISM

(71) Applicant: Arobotech Systems, Inc., Madison Heights, MI (US)

(72) Inventor: Richard Lessway, Bloomfield Hills, MI (US)

(73) Assignee: Arobotech Systems, Inc., Madison Heights, MI (US)

(*) Notice: Subject to any disclaimer, the term of this patent is extended or adjusted under 35 U.S.C. 154(b) by 0 days.

(21) Appl. No.: 14/459,626

(22) Filed: Aug. 14, 2014

(51) Int. Cl.
*B23B 25/00* (2006.01)
*B23Q 3/06* (2006.01)

(52) U.S. Cl.
CPC .......................................... *B23Q 3/06* (2013.01)

(58) Field of Classification Search
CPC ............ B25B 1/02; B25B 5/04; B25B 27/026
USPC .......... 269/164, 32, 24–27, 228; 82/164, 162, 82/157
See application file for complete search history.

(56) References Cited

U.S. PATENT DOCUMENTS

| 4,399,639 | A | * | 8/1983 | Lessway | ........................ | 451/408 |
| 4,519,279 | A | | 5/1985 | Ruggeri | | |
| 4,647,097 | A | | 3/1987 | Lessway | | |
| 4,647,100 | A | | 3/1987 | Lessway | | |
| 4,650,237 | A | * | 3/1987 | Lessway | ..................... | 294/119.1 |
| 5,058,468 | A | * | 10/1991 | Lessway | ........................ | 279/133 |
| 5,237,780 | A | * | 8/1993 | Lessway | ........................ | 451/408 |
| 5,285,599 | A | | 2/1994 | Lessway | | |
| 6,699,113 | B2 | * | 3/2004 | Lessway | ........................ | 451/408 |
| 7,566,061 | B2 | | 7/2009 | Townsend | | |
| 7,597,035 | B2 | * | 10/2009 | Rehm | ............................. | 82/157 |
| 8,251,374 | B2 | | 8/2012 | Bronzino et al. | | |
| 8,266,992 | B2 | * | 9/2012 | Rehm | ............................. | 82/157 |
| 8,726,772 | B2 | * | 5/2014 | Helm et al. | ..................... | 82/162 |
| 2011/0260416 | A1 | | 10/2011 | Helm | | |
| 2012/0119452 | A1 | | 5/2012 | Blaser et al. | | |
| 2012/0255407 | A1 | * | 10/2012 | Maurer et al. | .................. | 82/164 |
| 2012/0260779 | A1 | * | 10/2012 | Maurer et al. | .................. | 82/164 |
| 2013/0047804 | A1 | | 2/2013 | Maurer et al. | | |
| 2013/0056941 | A1 | | 3/2013 | Helm | | |
| 2014/0001712 | A1 | | 1/2014 | Helm et al. | | |

FOREIGN PATENT DOCUMENTS

| EP | 0529218 A1 | 3/1993 |
| EP | 0562180 A1 | 9/1993 |
| EP | 0602366 A1 | 6/1994 |

* cited by examiner

*Primary Examiner* — Lee D Wilson
(74) *Attorney, Agent, or Firm* — Harness, Dickey & Pierce, PLC

(57) ABSTRACT

A fixture mechanism may include first and second outer plates, a central plate and first and second guide members. The second outer plate includes a first face facing the first outer plate. The second outer plate may include first and second guide channels and a guide-member recess. The guide channels may be fixed relative to the first outer plate. The central plate is movably disposed between the first and second outer plates. The central plate may slidably engage first and second gripping arms that are movable relative to the outer plates between a clamped position and a retracted position. The guide members may be received in the guide-member recess and may be movable relative to the second outer plate and relative to each other within the guide-member recess to adjust a position at which the workpiece will be clamped when the gripping arms are in the clamped position.

27 Claims, 9 Drawing Sheets

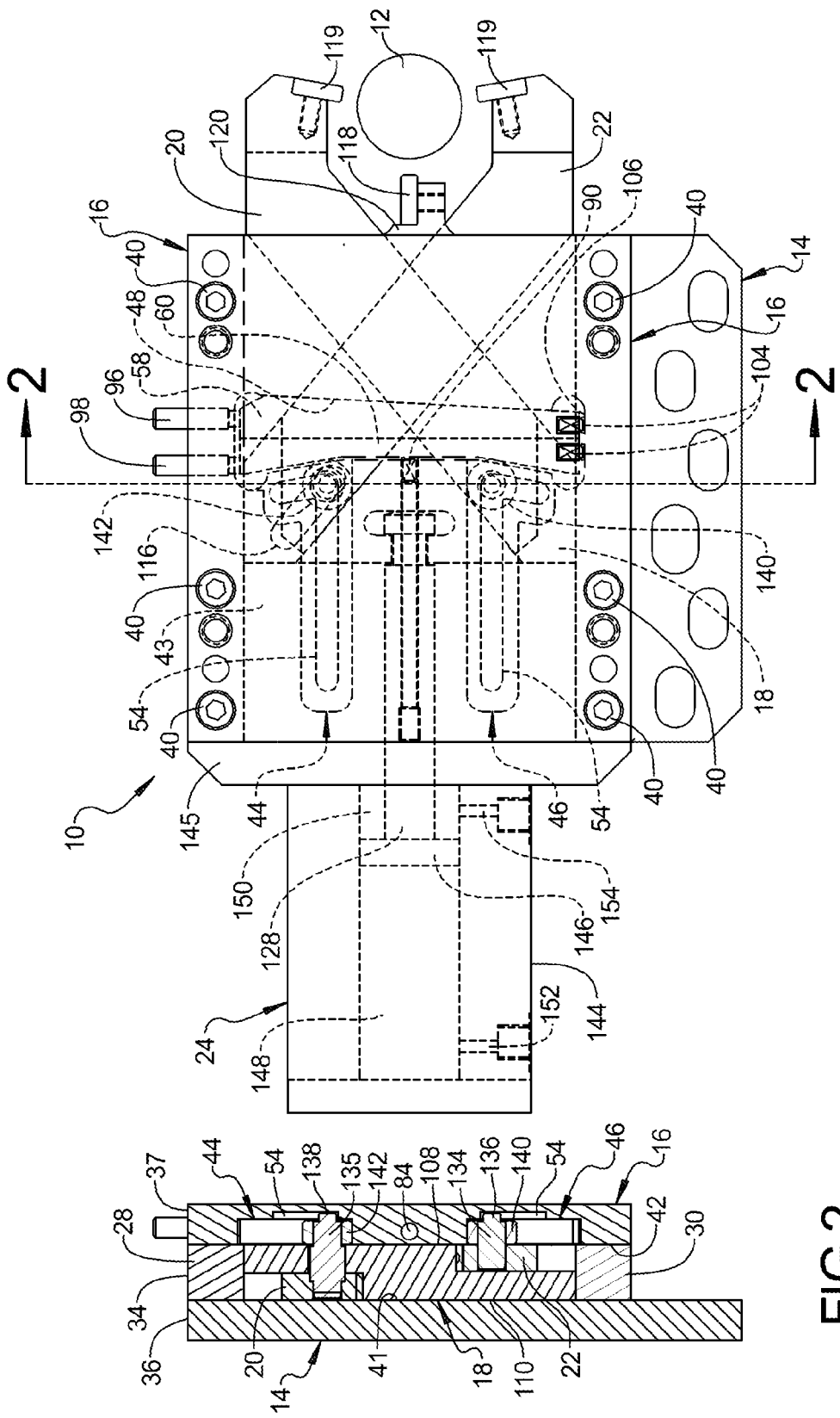

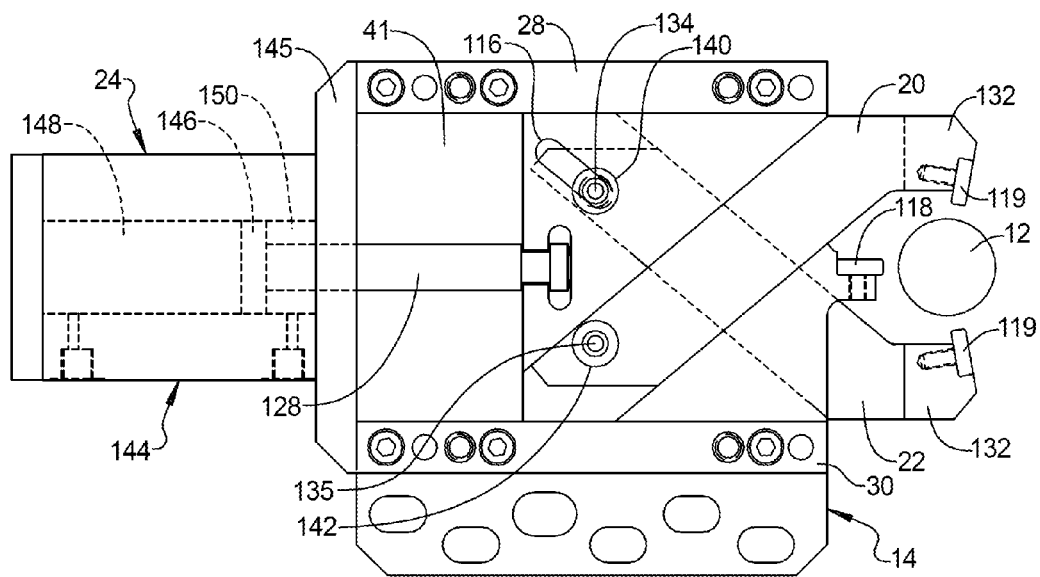
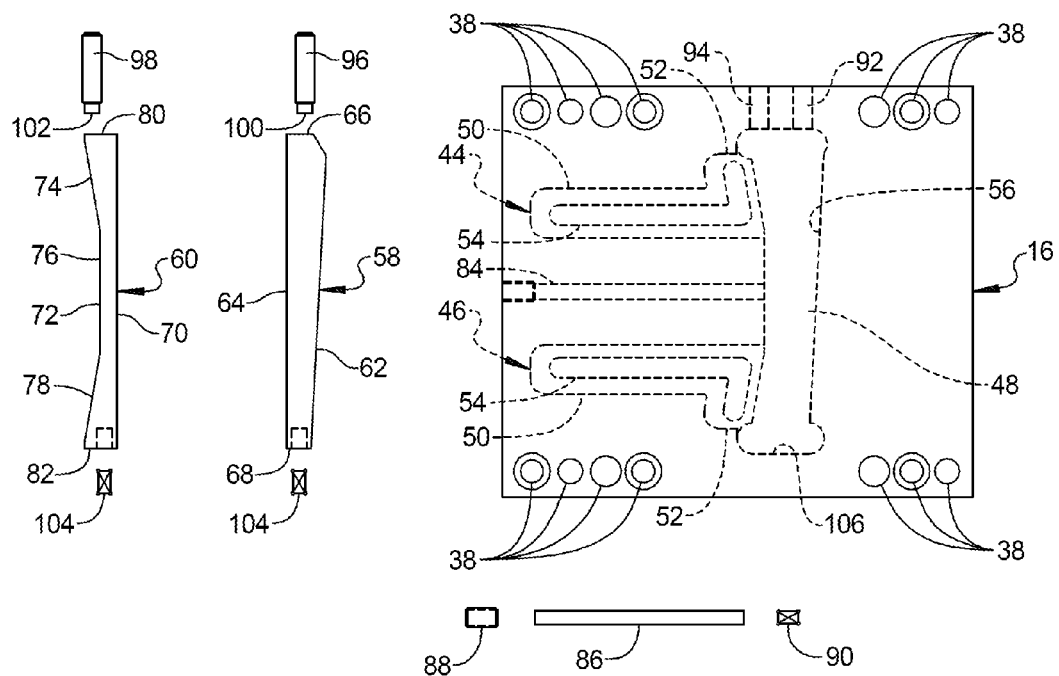
FIG 4

ADJUSTABLE FIXTURE MECHANISM

FIELD

The present disclosure relates to an adjustable fixture mechanism.

BACKGROUND

This section provides background information related to the present disclosure and is not necessarily prior art.

Fixtures are commonly used for securing a workpiece during a machining operation, such as grinding, turning, milling, boring, for example. Gripping arms on the fixture may secure the workpiece while a cutting tool, such as a blade or bit removes material from the workpiece. Known fixtures may include an adjustment mechanism for adjusting the position or location of the gripping arms to ensure the accuracy of the machining operations relative to the workpiece. End users expect the adjustment mechanisms to be accurate, repeatable and reliable. Reducing the number of parts, particularly the number of moving parts, is advantageous and may increase the reliability of the mechanism and reduce the likelihood of the moving parts coming into contact with contaminants. Furthermore, reducing the number of parts may reduce manufacturing costs and complexity.

SUMMARY

This section provides a general summary of the disclosure, and is not a comprehensive disclosure of its full scope or all of its features.

In one form, the present disclosure provides a fixture mechanism for holding a workpiece. The fixture mechanism may include first and second outer plates, a central plate and first and second guide members. The first and second outer plates cooperate to form a cavity therebetween. The second outer plate includes a first face facing the first outer plate. The second outer plate may include first and second guide channels and a guide-member recess formed into the first face and exposed to the cavity. The first and second guide channels may be fixed relative to the first outer plate. The central plate is disposed within the cavity and may directly or indirectly slidably engage the first and second outer plates. The central plate may slidably engage first and second gripping arms. The gripping arms are movable relative to the first and second outer plates between a clamped position and a retracted position. The first and second guide members may be received in the guide-member recess and may directly or indirectly contact each other. The first and second guide members may be movable relative to the second outer plate and relative to each other within the guide-member recess to adjust a position relative to the first and second outer plates at which the workpiece will be clamped when the first and second gripping arms are in the clamped position.

In some embodiments, the fixture mechanism includes first and second adjustment members threadably received in first and second apertures, respectively, of the second outer plate. The first and second adjustment members extend into the guide-member recess. The first adjustment member abuts the first guide member and is rotatable relative to the second outer plate to adjust a position of the first guide member within the guide-member recess. The second adjustment member abuts the second guide member and is rotatable relative to the second outer plate to adjust a position of the second guide member within the guide-member recess.

In some embodiments, the fixture mechanism includes first and second springs biasing the first and second guide members into contact with the first and second adjustment members.

In some embodiments, the fixture mechanism includes a third spring extending into the guide-member recess and biasing the second guide member toward the first guide member.

In some embodiments, the first and second guide members, the first, second and third springs, and the first and second adjustment members are the only components disposed within the guide-member recess.

In some embodiments, the fixture mechanism includes a rod received in a third aperture extending through the second outer plate. The third spring may be at least partially received in the aperture and abuts an axial end of the rod.

In some embodiments, the first guide member includes a flat first side and a flat second side opposing side. The first side may extend at a non-perpendicular angle relative to the second side. The first side may slidably abut a flat wall of the guide-member recess.

In some embodiments, the wall of the guide-member recess and the first side of the first guide member are disposed at a non-perpendicular angle relative to an axis along which the central plate moves relative to the first and second outer plates.

In some embodiments, the second guide member includes a first side and a second side opposite the first side, wherein the first side of the second guide member slidably abuts the second side of the first guide member. The second side of the second guide member may include first, second and third surfaces, the first and third surfaces being flat and angled relative to each other and relative to the axis. The second surface is disposed between the first and third surfaces.

In some embodiments, the first and second gripping arms include pins extending therefrom and slidably received in the first and second guide channels. The pins may directly or indirectly contact the first and third surfaces of the of the second guide member along a portion of range of motion of the pins.

In some embodiments, the pins include bushings that are movably received in the first and second guide channels. Distal ends of the first and second pins may be received in recesses formed in the first and second guide channels.

In some embodiments, the guide-member recess is in communication with the first and second guide channels.

In another form, the present disclosure provides a fixture mechanism that includes first and second outer plates, a central plate and first and second guide members. The first and second outer plates cooperate to form a cavity therebetween. The second outer plate includes a first face facing the first outer plate. The second outer plate may include first and second guide channels and a guide-member recess formed into the first face and exposed to the cavity. The central plate may be disposed within the cavity and may slidably receive first and second gripping arms. The gripping arms may be movable relative to the first and second outer plates between a clamped position and a retracted position. The gripping arms may include pins extending therefrom and movably received in the guide channels. The first and second guide members are received in the guide-member recess and may directly or indirectly contact each other. The first and second guide members may be movable relative to the second outer plate and relative to each other within the guide-member recess. The second guide member may directly or indirectly contact the pins of the gripping arms during a portion of the range of motion of the gripping arms and guide the gripping arms to the clamped position.

In some embodiments, the pins include bushings that directly or indirectly contact the second guide member.

In some embodiments, movement of the first and second guide members relative to the second outer plate adjusts a position relative to the first and second outer plates at which a workpiece will be clamped when the first and second gripping arms are in the clamped position.

In some embodiments, the fixture mechanism includes first and second adjustment members threadably received in first and second apertures, respectively, of the second outer plate and extending into the guide-member recess. The first adjustment member may abut the first guide member and may be rotatable relative to the second outer plate to adjust a position of the first guide member within the guide-member recess. The second adjustment member may abut the second guide member and may be rotatable relative to the second outer plate to adjust a position of the second guide member within the guide-member recess.

In some embodiments, the fixture mechanism includes first and second springs biasing the first and second guide members into contact with the first and second adjustment members.

In some embodiments, the fixture mechanism includes a third spring extending into the guide-member recess and biasing the second guide member toward the first guide member.

In some embodiments, the first and second guide members, the first, second and third springs, and the first and second adjustment members are the only components disposed within the guide-member recess.

In some embodiments, the fixture mechanism includes a rod received in a third aperture extending through the second outer plate. The third spring may be at least partially received in the aperture and abuts an axial end of the rod.

In some embodiments, the first guide member includes a flat first side and a flat second side opposing side, wherein the first side extends at a non-perpendicular angle relative to the second side. The first side may slidably abut a flat wall of the guide-member recess.

In some embodiments, the wall of the guide-member recess and the first side of the first guide member are disposed at a non-perpendicular angle relative to an axis along which the central plate moves relative to the first and second outer plates.

In some embodiments, the second guide member includes a first side and a second side opposite the first side, wherein the first side of the second guide member slidably abuts the second side of the first guide member. The second side of the second guide member may include first, second and third surfaces. The first and third surfaces may be flat and angled relative to each other and relative to the axis. The second surface may be disposed between the first and third surfaces.

In some embodiments, the pins directly or indirectly contact the first and third surfaces of the of the second guide member along a portion of range of motion of the pins.

In some embodiments, the first and second guide channels are fixed relative to the first outer plate.

In some embodiments, the pins include bushings that are movably received in the first and second guide channels. Distal ends of the first and second pins may be received in recesses formed in the first and second guide channels.

In some embodiments, the guide-member recess is in communication with the first and second guide channels.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a plan view of an adjustable fixture mechanism according to the principles of the present disclosure;

FIG. 2 is a cross-sectional view of the fixture mechanism taken along line 2-2 of FIG. 1;

FIG. 4 is another partially exploded view of the fixture mechanism;

Corresponding reference numerals indicate corresponding parts throughout the several views of the drawings.

DETAILED DESCRIPTION

Figure 3:
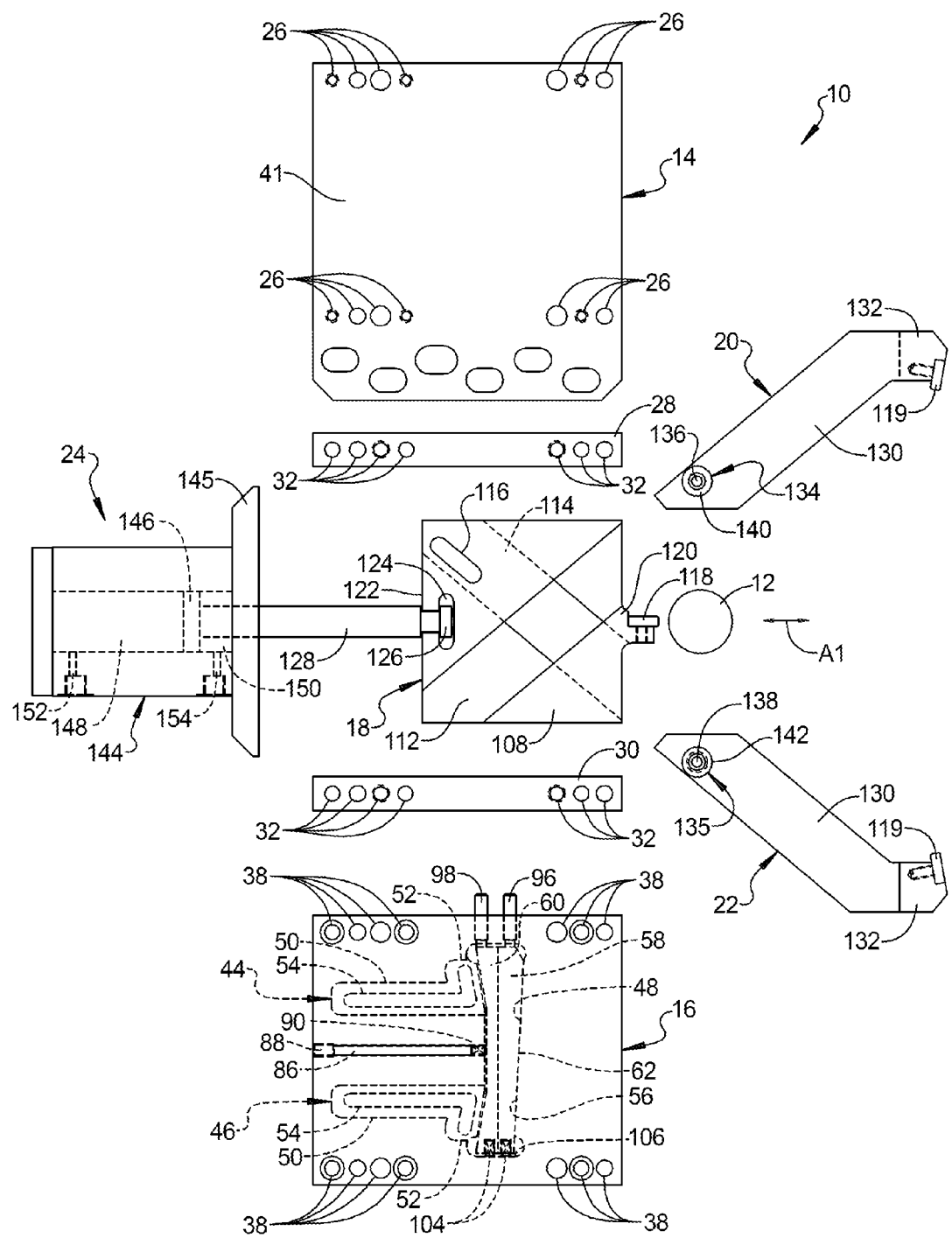
FIG. 3 is a partially exploded view of the fixture mechanism.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-13, an adjustable fixture mechanism 10 is provided that may clamp a workpiece 12 to secure the workpiece 12 relative to the fixture mechanism 10 during a machining operation (e.g., grinding or turning). The fixture mechanism 10 may include a first outer plate 14, a second outer plate 16, a central plate 18, first and second gripping arms 20, 22, and an actuation mechanism 24. As will be described in more detail below, the actuation mechanism 24 is operable to move the central plate 18 and the gripping arms 20, 22 between a clamped position (FIG. 6) in which the fixture mechanism 10 grips the workpiece 12 and a retracted position (FIG. 7) in which the workpiece 12 is released and the gripping arms 20, 22 are retracted into the fixture mechanism 10. The fixture mechanism 10 can be adjusted to move a position of the clamped workpiece 12 in two dimensions (e.g., horizontally and vertically).

As shown in FIG. 3, the first outer plate 14 is a generally solid, flat plate having a plurality of threaded and unthreaded mounting apertures 26. First and second rails 28, 30 (FIGS. 2 and 3) may be mounted (directly or indirectly) to the first outer plate 14. The first and second rails 28, 30 may include threaded and/or unthreaded apertures 32 aligned with the apertures 26 in the first outer plate 14. As shown in FIG. 2, an outer edge face 34 of the first rail 28 may be substantially flush with an outer edge face 36 of the first outer plate 14 and with an outer edge face 37 of the second outer plate 14.

The second outer plate 16 may include a plurality of apertures 38 that are aligned with the apertures 32 of the rails 28, 30 and with the apertures 26 of the first outer plate 14. As shown in FIG. 1, bolts 40 or other fasteners may be received in some or all of the apertures 26, 32, 38 to fixedly secure the first and second outer plates 14, 16 to each other with the rails 28, 30 and the central plate 18 sandwiched therebetween (as shown in FIG. 2). The first and second outer plates 14, 16 and the rails 28, 30 cooperate to define a cavity 43 in which the central plate 18 and the gripping arms 20, 22 are movably received. As shown in FIG. 2, a first face 42 of the second outer plate 16 may directly abut the rails 28, 30 and the central plate 18.

Figure 6:
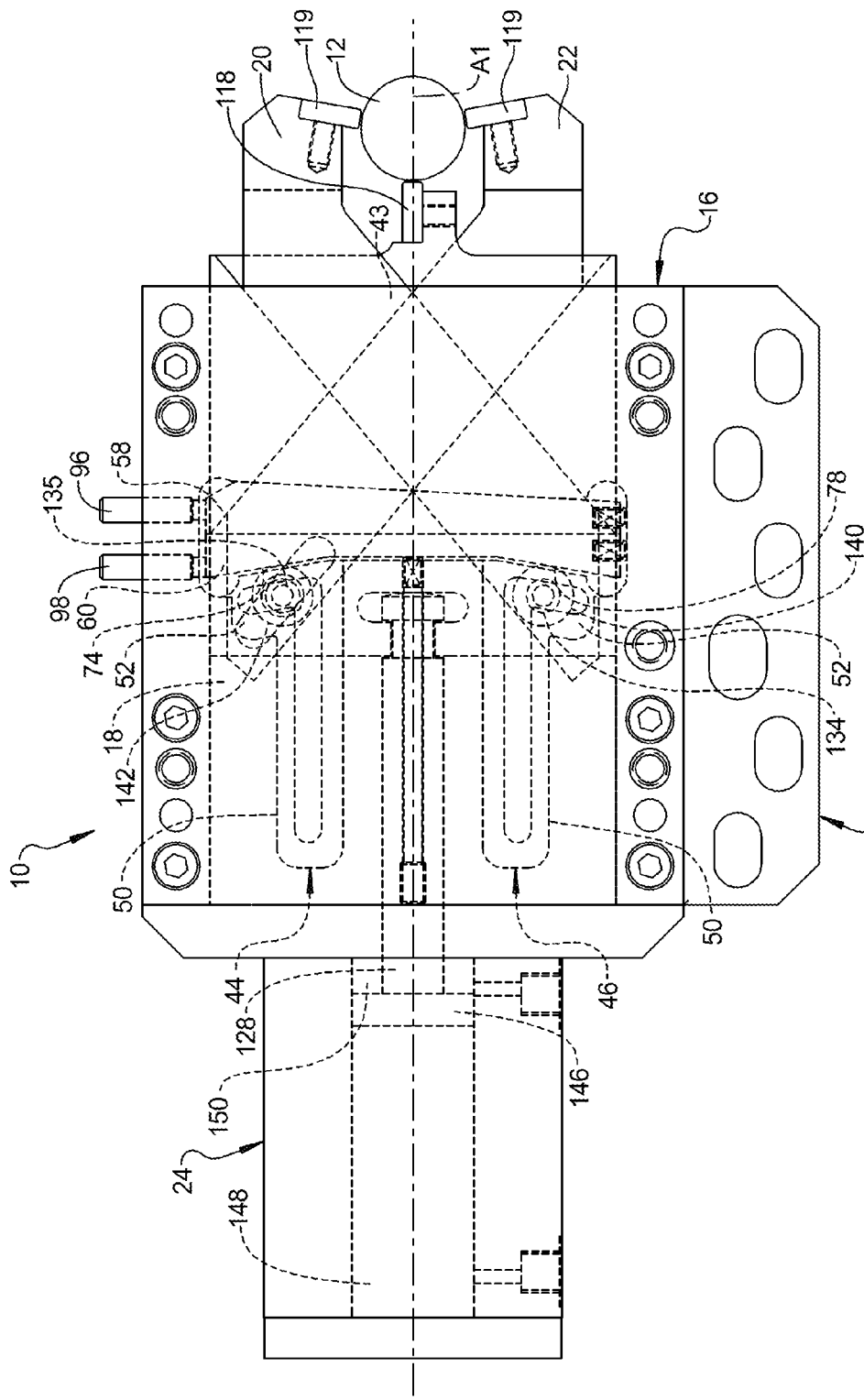
FIG. 6 is a plan view of the fixture mechanism in a clamped position.

As shown in FIG. 4, the second outer plate 16 may include first and second guide channels 44, 46 and a guide-member recess 48 formed in the first face 42. For example, the guide channels 44, 46 and recess 48 could be machined (e.g., milled and/or ground) into the first face 42. Each of the guide channels 44, 46 may include an elongated first leg 50 and a relatively shorter second leg 52. The first legs 50 of the first and second guide channels 44, 46 may extend parallel to each other and parallel to a longitudinal axis A1 (FIG. 6). Each of the second legs 52 may extend from an end of a corresponding one of the first legs 50 in a direction that is laterally outward and away from the workpiece 12 (i.e., an acute angle is formed between the first and second legs 50, 52 of each of the guide channels 44, 46). As shown in FIGS. 2 and 4, a groove 54 may be formed in each of the guide channels 44, 46. The grooves 54 may extend along the first and second legs 50, 52 and may have substantially the same shape as the first and second legs 50, 52. In this manner, the guide channels 44, 46 and the grooves 54 form a stepped recess with the grooves 54 extending deeper into the thickness of the second outer plate 16 than the guide channels 44, 46 (as shown in FIG. 2).

The guide-member recess 48 formed in the second outer plate 16 extends laterally between the first and second guide channels 44, 46 and is in communication with the first and second guide channels 44, 46 (i.e., the first and second guide channels 44, 46 extend through to the guide-member recess 48). A first wall 56 of the guide-member recess 48 extends at a non-perpendicular angle relative to the longitudinal axis A1. As shown in FIGS. 1 and 3, first and second guide members 58, 60 may be movably received in the guide-member recess 48. Thicknesses of the guide members 58, 60 may be substantially equal to or less than the depth of the guide-member recess 48 so that the guide members 58, 60 are flush or sub-flush with the first face 42 of the second outer plate 16.

The first guide member 58 includes a first side 62 (FIGS. 3 and 4) that abuts and lies flat against the first wall 56 of the guide-member recess 48. Therefore, the first side 62 is disposed at a non-perpendicular angle relative to the longitudinal axis A1. A second side 64 (FIG. 4) of the first guide member 58 extends at an acute angle relative to the first side 62 and may be perpendicular to the longitudinal axis A1. Third and fourth sides 66, 68 of the first guide member 58 may be substantially perpendicular to the second side 64 (i.e., parallel to the longitudinal axis A1.

The second guide member 60 includes a first side 70 that may directly or indirectly abut and lie flat against the second side 64 of the first guide member 58. Therefore, the first side 70 may be perpendicular to the longitudinal axis A1. A second side 72 of the second guide member 60 may include first, second and third surfaces 74, 76, 78. The second surface 76 is disposed between the first and third surfaces 74, 78 and may be substantially parallel to the first side 70. The first and third surfaces 74, 78 are angled relative to each other and both form obtuse angles with the second surface 76. Third and fourth sides 80, 82 of the second guide member 60 may be substantially parallel to the longitudinal axis A1.

The first and second guide members 58, 60 are movable within the guide-member recess 48 independently of each other. The first side 62 of the first guide member 58 slidably engages the first wall 56 of the guide-member recess 48. The first side 70 of the second guide member 60 slidably engages the second side 64 of the first guide member 58.

The second outer plate 16 may include an elongated aperture 84 (FIG. 4) that extends along or parallel to the longitudinal axis A1 and communicates with the guide-member recess 48. A rod 86 may be received in the aperture 84 and may be retained therein by a plug 88 that may threadably engage the aperture 84, for example. A spring 90 may be disposed between an axial end of the rod 86 and the second surface 76 of the second guide member 60. The spring 90 may bias the second guide member 60 into engagement with the first guide member 58.

As shown in FIG. 4, the second outer plate 16 may include first and second threaded apertures 92, 94 that extend perpendicular to the longitudinal axis A1 and communicate with the guide-member recess 48. First and second threaded adjustment rods 96, 98 may threadably engage the threaded apertures 92, 94, respectively, and extend into the guide-member recess 48. An axial end 100 of the first adjustment rod 96 abuts the third side 66 of the first guide member 58. An axial end 102 of the second adjustment rod 98 abuts the third side 80 of the second guide member 60. A pair of springs 104 may be disposed between a second wall 106 of the guide-member-recess 48 and a corresponding one of the first and second guide members 58, 60. The springs 104 bias the guide members 58, 60 into contact with the axial ends 100, 102 of the adjustment rods 96, 98. In this manner, the guide members 58, 60 move toward and away from the second wall 106 (in the directions shown in FIGS. 8-11) as the adjustment rods 96, 98 are threadably moved along the threaded apertures 92, 94 into and out of the guide-member recess 48.

Figure 8:
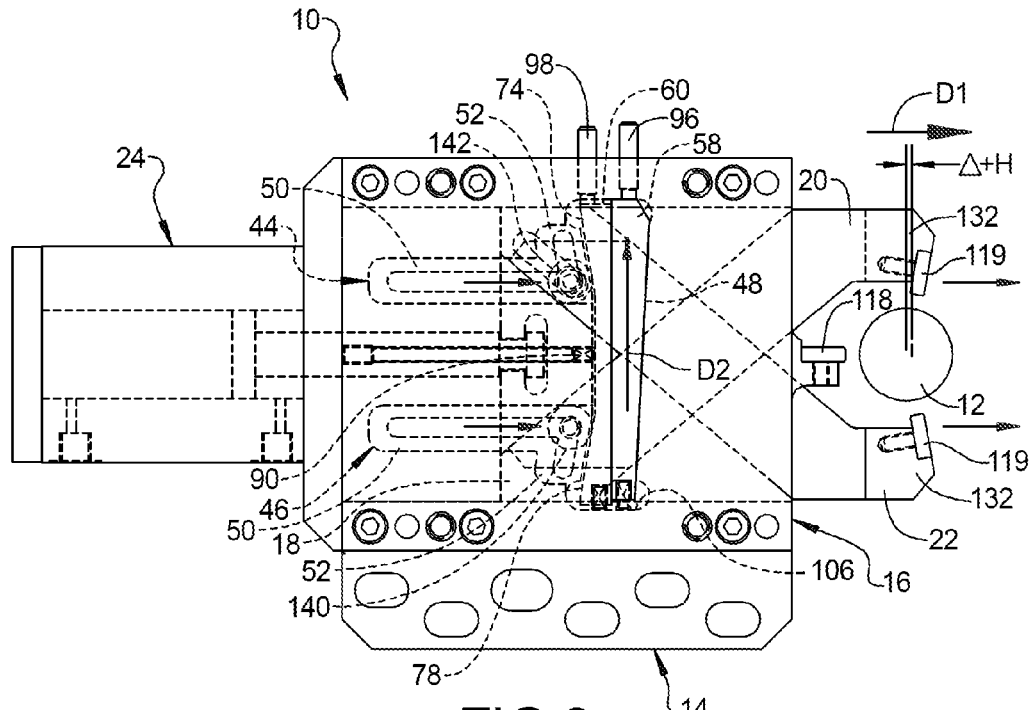
FIG. 8 is a plan view of the fixture mechanism in a first horizontal position.
Figure 9:
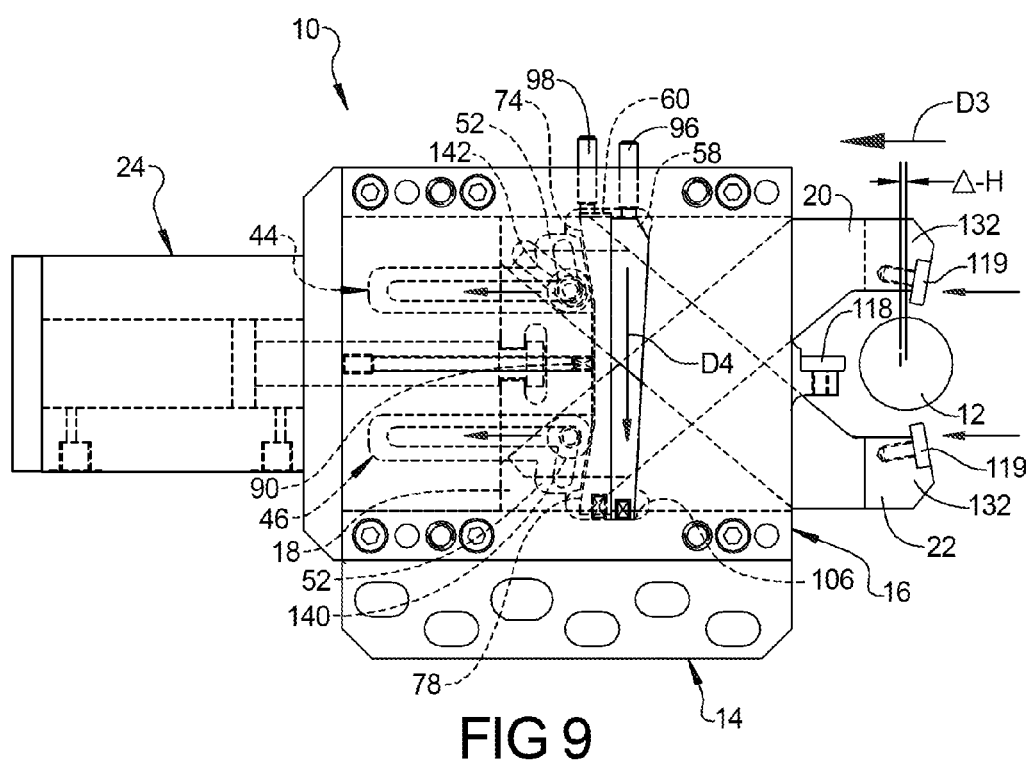
FIG. 9 is a plan view of the fixture mechanism in a second horizontal position.
Figure 10:
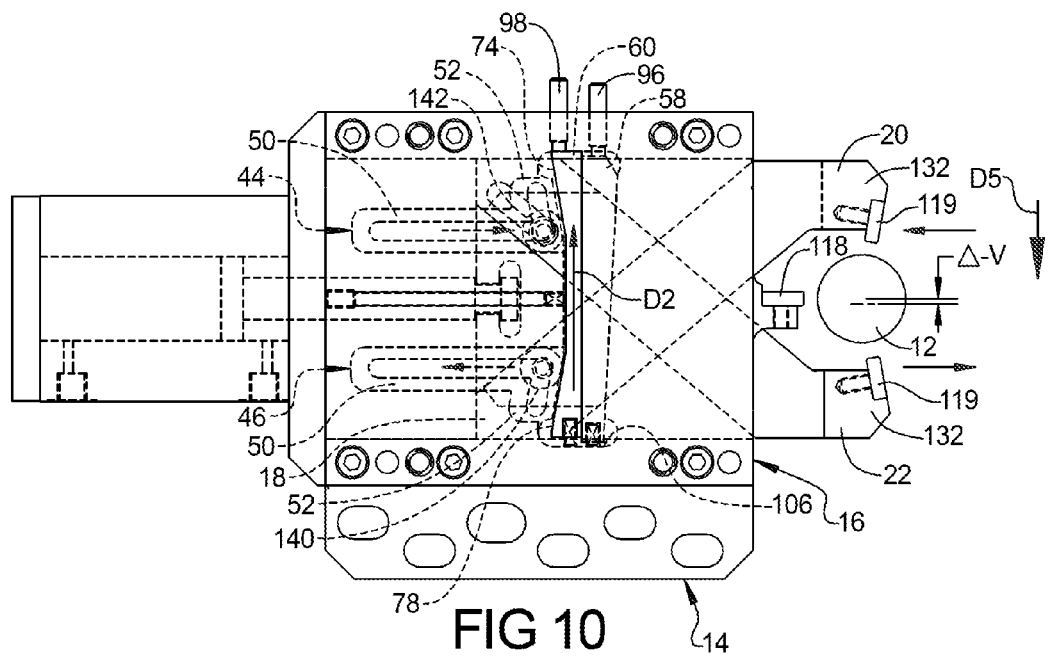
FIG. 10 is a plan view of the fixture mechanism in a first vertical position.
Figure 11:
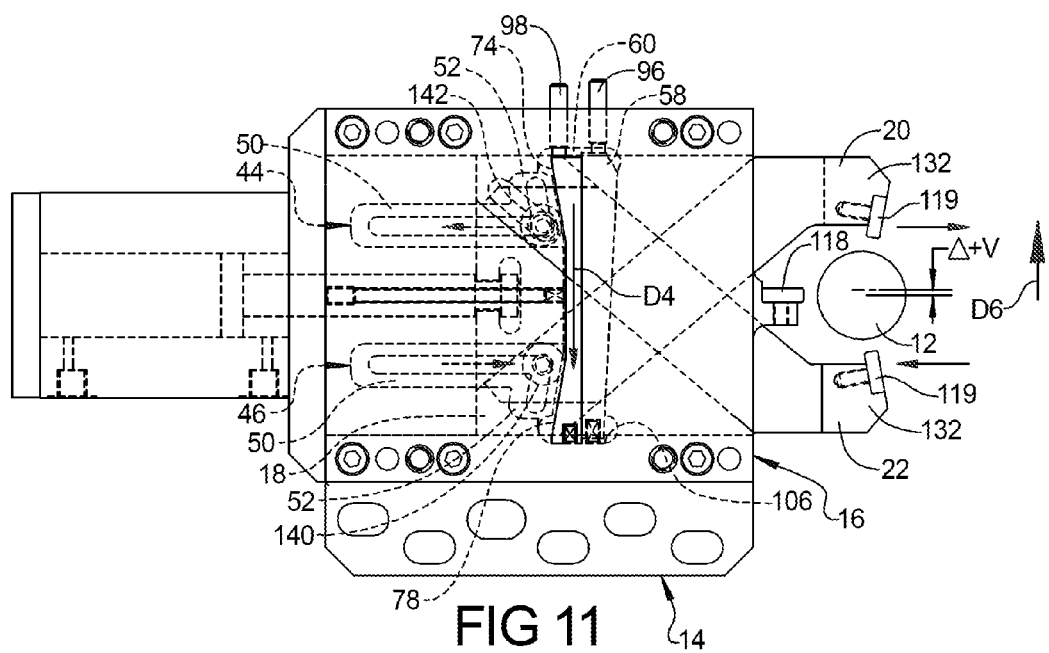
FIG. 11 is a plan view of the fixture mechanism in a second vertical position.

Threadably adjusting the position of the first adjustment rod 96 causes the first guide member 58 to slide along the first wall 56 of the guide-member recess 48. Due to the relative angle between the first wall 56 and the first side 70 of the second guide member 60, movement of the first guide member 58 along the first wall 56 causes corresponding movement of the second guide member 60 toward or away from the first wall 56 in directions along or parallel to the longitudinal axis A1. That is, movement of the first guide member 58 toward the second wall 106 of the guide-member recess 48 causes the second guide member 60 to move away from the first wall 56 (as shown in FIG. 9). Movement of the first guide member 58 away from the second wall 106 of the guide-member recess 48 causes the second guide member 60 to move toward the first wall 56 (as shown in FIG. 8). Threadably adjusting the position of the second adjustment rod 98 causes the second guide member 60 to slide along the second side 64 of the first guide member 58 toward and away from the second wall 106 without moving the first guide member 58 (as shown in FIGS. 10 and 11).

Figure 5:
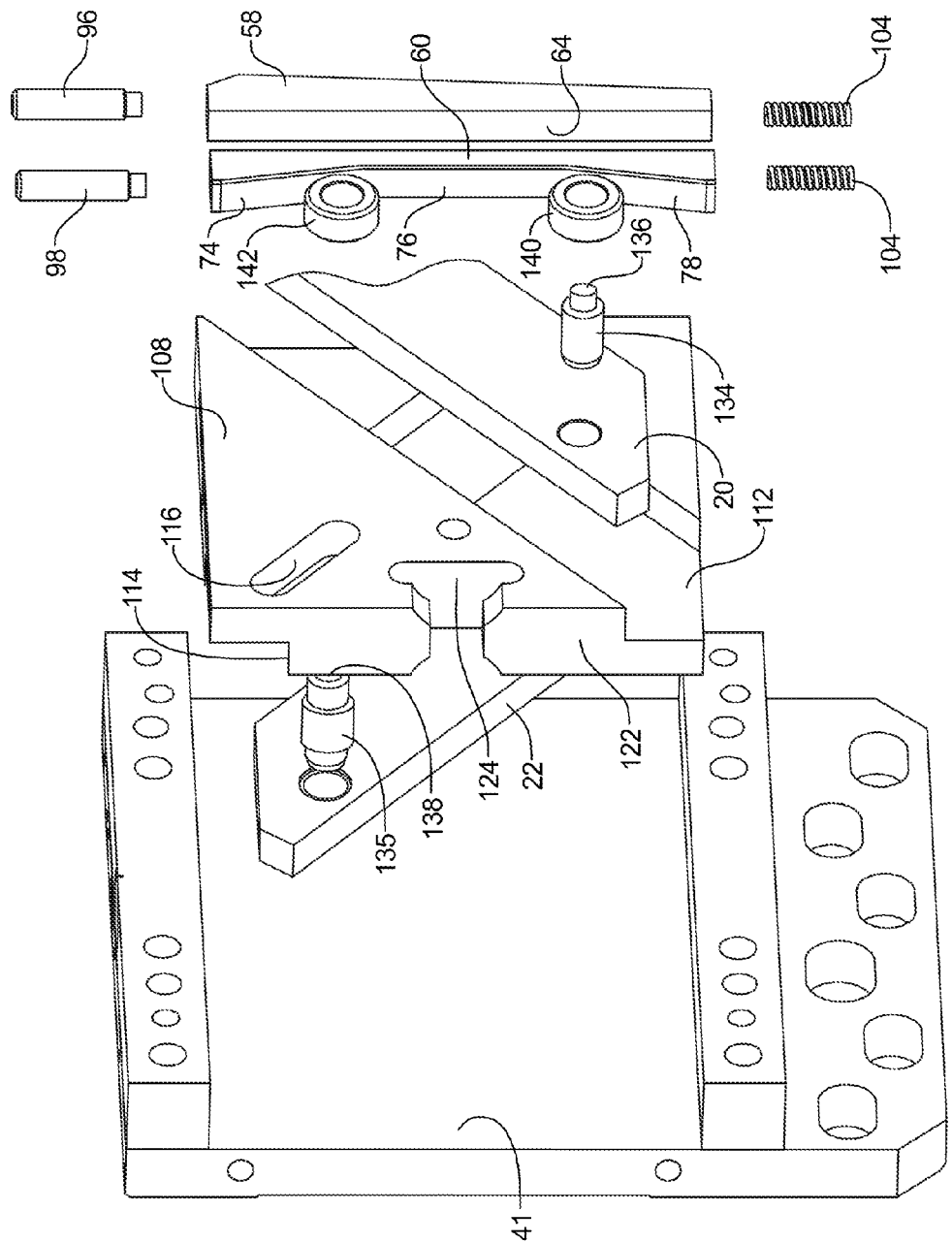
FIG. 5 is a partial perspective exploded view of the fixture mechanism.

The central plate 18 includes a first side 108 and a second side 110 opposite the first side 108 (FIG. 2). As shown in FIG. 2, a thickness of the central plate 18 may be substantially equal to thicknesses of the rails 28, 30 so that the first side 108 directly abuts and slidably engages the first face 42 of the second outer plate 16 and the second side 110 directly abuts and slidably engages a first face 41 of the first outer plate 14. As shown in FIGS. 3 and 5, a first channel 112 may be formed in the first side 108, and a second channel 114 may be formed in the second side 110. A slot 116 may extend through the first side 108 and into the second channel 114. A longitudinal axis of the slot 116 extends parallel to a longitudinal axis of the second channel 114. The first and second channels 112, 114 are angled relative to the longitudinal axis A1 and each other. The first and second channels 112, 114 cross each other (without intersecting each other) to form a generally X-shaped pattern. As will be described in more detail below, the first gripping arm 20 may be slidably received in the first channel 112, and the second gripping arm 22 may be slidably received in the second channel 114.

Figure 12:
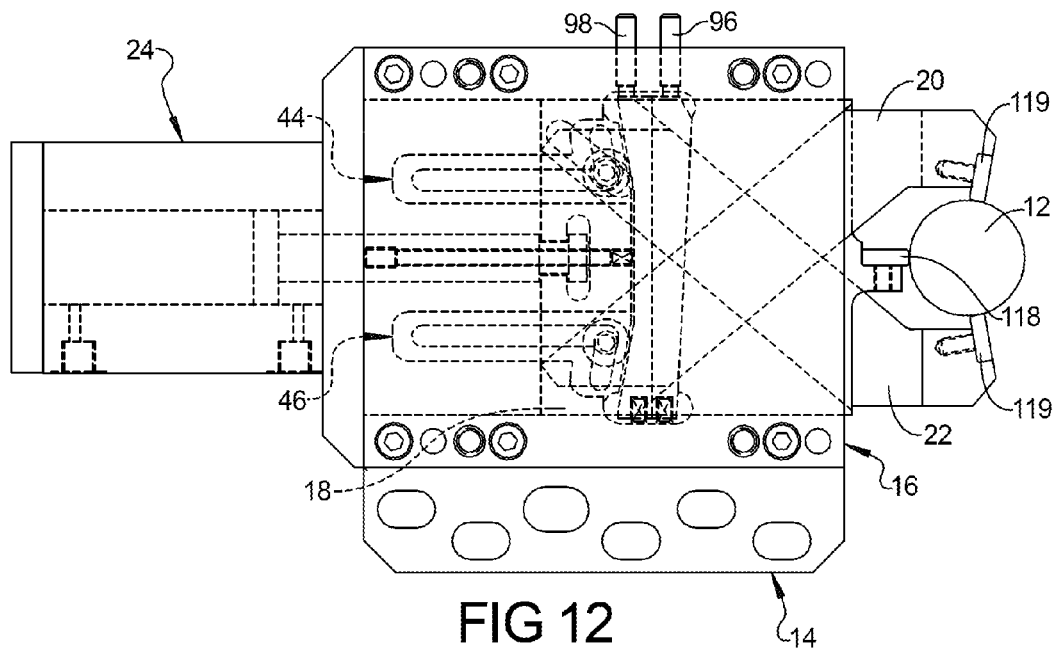
FIG. 12 is a plan view of the fixture mechanism clamping a workpiece of a first diameter.
Figure 13:
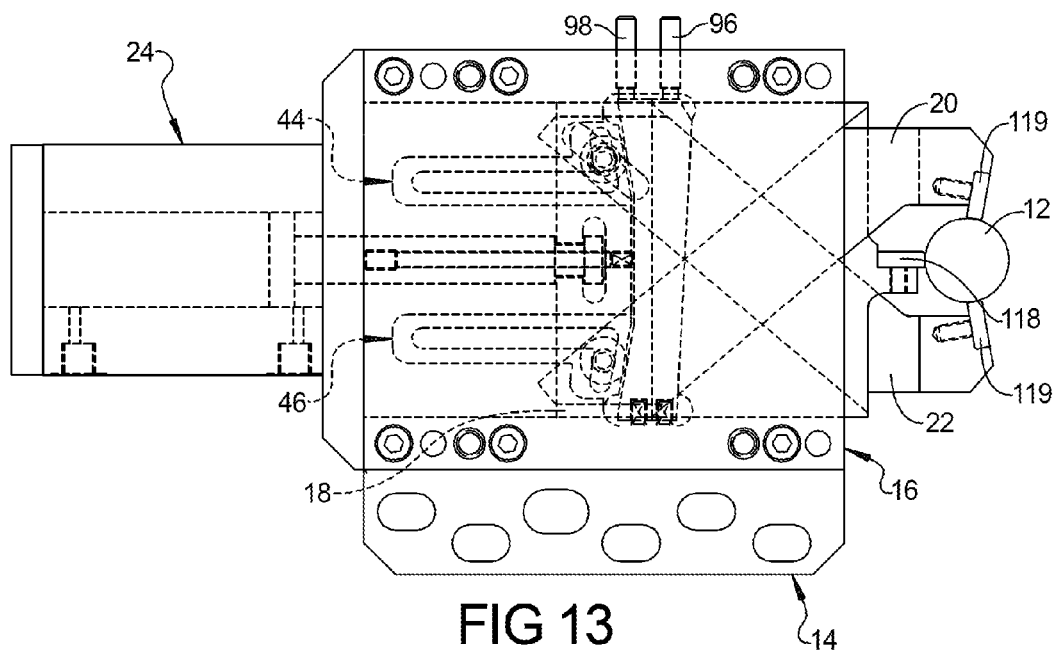
FIG. 13 is a plan view of the fixture mechanism clamping a workpiece of a second diameter.

A gripping finger 118 may extend from a first end 120 of the central plate 18 between the first and second channels 112, 114. The gripping finger 118 of the central plate 18 cooperates with gripping fingers 119 of the first and second gripping arms 20, 22 to grip the workpiece 12 when the fixture mechanism 10 is in the clamped position (FIGS. 6, 12 and 13).

A second end 122 of the central plate 18 may include a generally T-shaped aperture 124. As shown in FIG. 3, the T-shaped aperture 124 receives a similarly shaped end 126 of a ramrod 128 of the actuation mechanism 24.

Each of the first and second gripping arms 20, 22 may include an elongated first portion 130 and a relatively shorter second portion 132 (FIG. 3). The first and second portions 130, 132 are angled relative to each other. The gripping fingers 119 extend toward each other from the second portions 130, 132. The first portions 130 of the gripping arms 20, 22 include pins 134, 135 that protrude therefrom and extend into a corresponding one of the first and second guide channels 44, 46 in the second outer plate 16. That is, as shown in FIG. 2, the pin 134 of the first gripping arm 20 extends into the second guide channel 46 such that an axial end 136 of the pin 134 slidably engages the groove 54 of the second guide channel 46. The pin 135 of the second gripping arm 22 extends through the slot 116 of the central plate 18 and into the first guide channel 44 such that an axial end 138 of the pin 135 slidably engages the groove 54 of the first guide channel 44. The pins 134, 135 may include bushings 140, 142 that are slidably received in the second and first guide channels 46, 44, respectively.

As shown in FIG. 1, the actuation mechanism 24 may include a housing 144, a piston 146 and the ramrod 128. The housing 144 may include a flange 145 bolted or otherwise mounted to the first outer plate 14 and/or the second outer plate 16. The housing 144 and the piston 146 may cooperate to define first and second fluid chambers 148, 150 in communication with first and second ports 152, 154, respectively. The piston 146 may be attached to the ramrod 128 and may separate the first and second fluid chambers 148, 150 from each other. The ports 152, 154 may be in fluid communication with a source of working fluid (e.g., compressed air or hydraulic fluid). A fluid control device (not shown) may be operable to control a flow of the working fluid in and out of the ports 152, 154.

To move the piston 146 and ramrod 128 away from the workpiece 12, the control device may cause working fluid to flow into the second fluid chamber 150 while evacuating fluid from the first fluid chamber 148. To move the piston 146 and ramrod 128 toward the workpiece 12, the control device may cause working fluid to flow into the first fluid chamber 148 while evacuating fluid from the second fluid chamber 150. Because the ramrod 128 is connected to the central plate 18, movement of the piston 146 and ramrod 128 toward and away from the workpiece 12 causes corresponding movement of the central plate 18 toward and away from the workpiece 12 with the ramrod 128. While the actuation mechanism 24 is described above as being a fluid-actuated device, it will be appreciated that any type of actuator could be used (e.g., an electric motor or other electromechanical device).

With continued reference to FIGS. 1-13, operation of the fixture mechanism 10 will be described in detail. As described above, the actuation mechanism 24 is operable to move the central plate 18 and the gripping arms 20, 22 between a clamped position (FIG. 6) in which the fixture mechanism 10 grips the workpiece 12 and a retracted position (FIG. 7) in which the workpiece 12 is released and the gripping arms 20, 22 are retracted into the fixture mechanism 10. The fixture mechanism 10 can be adjusted to move a position of the workpiece 12 relative to the fixture mechanism 10 when the fixture mechanism 10 is in the clamped position (see FIGS. 8-11).

Figure 7:
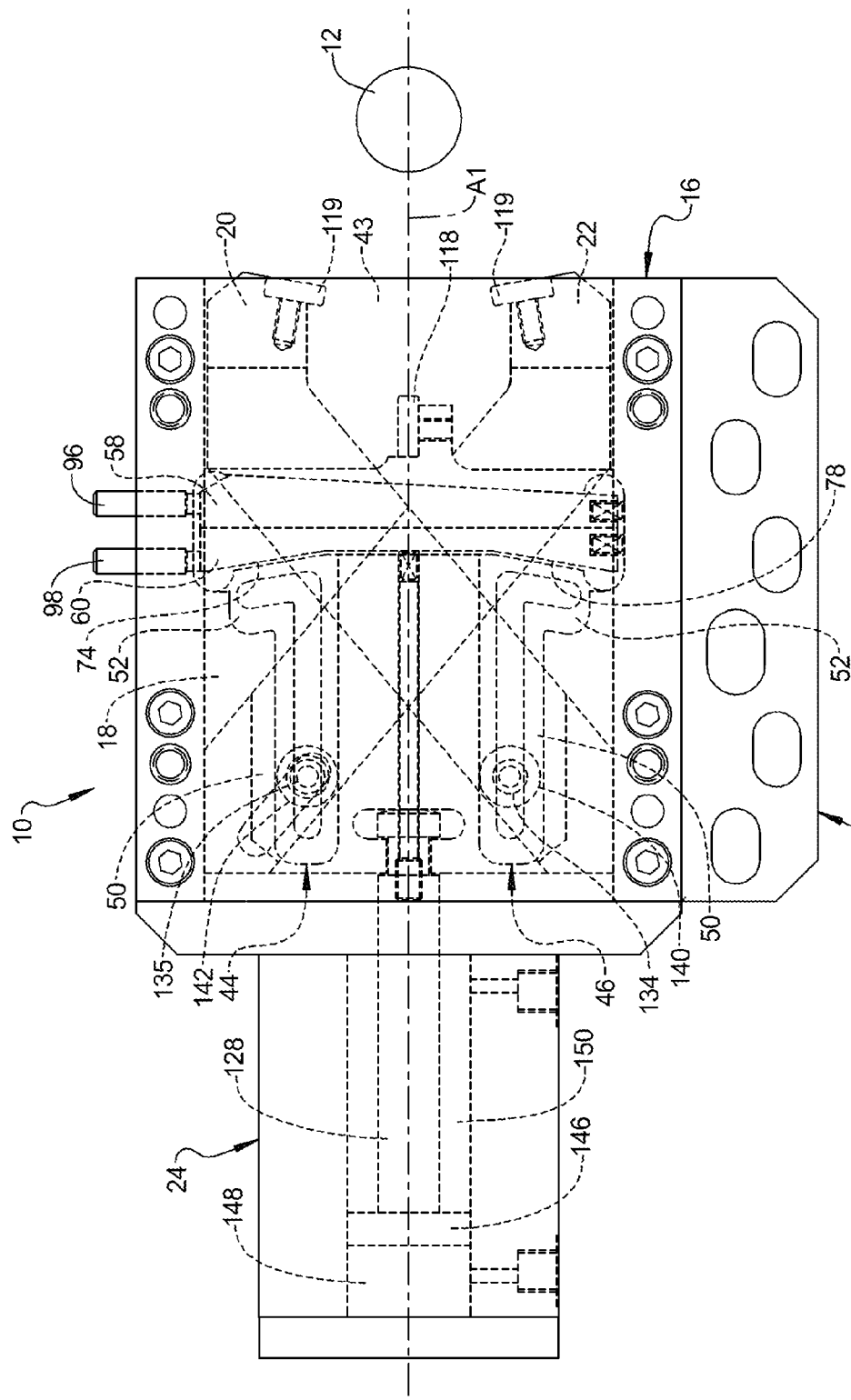
FIG. 7 is a plan view of the fixture mechanism in a retracted position.

To move the fixture mechanism 10 from the retracted position (FIG. 7) to the clamped position (FIG. 6), working fluid can be injected into the first chamber 148 of the actuation mechanism 24 and working fluid can be evacuated from the second chamber 150, thereby causing the piston 146 and the ramrod 128 to move relative to the first and second outer plates 14, 16 toward the workpiece 12 (i.e., to the right relative to the frame of reference of FIG. 7).

As described above, the central plate 18 and the gripping arms 20, 22 move with the ramrod 128 along the longitudinal axis A1 relative to the first and second outer plates 14, 16. As the central plate 18 and gripping arms 20, 22 move toward the clamped position (FIG. 6), the pins 134, 135 and bushings 140, 142 slide along the first legs 50 of the corresponding guide channels 44, 46 in the second outer plate 16. Continued movement of the ramrod 128 and central plate 18 along the longitudinal axis A1 toward the workpiece 12 will cause the bushings 142, 140 to come into contact with the first and third surfaces 74, 78, respectively, of the second guide member 60. Once the bushings 142, 140 are in contact with the first and third surfaces 74, 78, continued movement of the ramrod 128 and central plate 18 along the longitudinal axis A1 toward the workpiece 12 will cause the pins 134, 135 and bushings 140, 142 to slide laterally outward along the second legs 52 of the guide channels 44, 46. As the pins 134, 135 and bushings 140, 142 slide laterally outward along the second legs 52 of the guide channels 44, 46, the protruding ends (i.e., the second portions 132) of the gripping arms 20, 22 will move laterally toward each other in a direction perpendicular to the longitudinal axis A1 (i.e., the gripping arms 20, 22 will slide in the channels 112, 114, respectively, relative to the central plate 18) until the gripping fingers 119 of the gripping arms 20, 22 and the gripping finger 118 of the central plate 18 come into contact with and securely clamp the workpiece 12 (as shown in FIG. 6).

A comparison of FIGS. 12 and 13 shows that for a workpiece 12 with a relatively large diameter (as shown in FIG. 12), the gripping arms 20, 22 need only move a relatively small distance toward each other (in the direction perpendicular to the longitudinal axis A1) before coming into contact with the workpiece 12. Whereas, for a workpiece 12 with a relatively small diameter (as shown in FIG. 13), the gripping arms 20, 22 move a relatively greater distance toward each other (in the direction perpendicular to the longitudinal axis A1) before coming into contact with the workpiece 12.

To move the fixture mechanism 10 from the clamped position (FIG. 6) to the retracted position (FIG. 7), working fluid can be injected into the second chamber 150 of the actuation mechanism 24 and working fluid can be evacuated from the first chamber 148, thereby causing the piston 146, the ramrod 128 and the central plate 18 to move relative to the first and second outer plates 14, 16 away from the workpiece 12 (i.e., to the left relative to the frame of reference of FIG. 6). Such movement of the central plate 18 will reverse the movement of the gripping arms 20, 22 described above. That is, movement of the central plate 18 away from the workpiece 12 causes the second portions 132 of the gripping arms 20, 22 to move laterally away from each other and away from the workpiece 12 before the gripping arms 20, 22 retract back into the cavity 43 between the first and second outer plates 14, 16 with the central plate 18 toward the retracted position (FIG. 7).

As described above, the adjustment rods 96, 98 can be turned to adjust the position (relative to the first and second outer plates 14, 16) in which the workpiece 12 will be clamped by the gripping fingers 118, 119. As shown in FIG. 8, to move the position in which the gripping fingers 118, 119 will grip the workpiece 12 in a first direction D1 (e.g., a horizontal direction along the longitudinal axis A1) away from the first and second outer plates 14, 16, the user may rotate the first adjustment rod 96 in a direction that causes movement of the first guide member 58 within the guide-member recess 48 away from the wall 106 in a second direction D2 perpendicular to the longitudinal axis A1. Due to the angle of the wall 56 of the recess 48 and of the side 62 of the first guide member 58 and due to the spring 90 biasing the second guide member 60 into contact with the first guide member 58, movement of the first guide member 58 in the second direction D2 causes the second guide member 60 to move within the guide-member recess 48 relative to the guide channels 44, 46 in the first direction D1. By moving the second guide member 60 in the first direction D1, the position along the guide channels 44, 46 at which the bushings 140, 142 will contact the surfaces 74, 78 of the second guide member 60 will be moved in the first direction D1, thereby allowing the central plate 18 and the gripping arms 20, 22 to move further in the first direction D1 before the surfaces 74, 78 of the second guide member 60 guide the bushings 140, 142 along the second legs 52 of the guide channels 44, 46. As described above, the motion of the bushings 140, 142 sliding along the second legs 52 of the guide channels 44, 46 is what causes the portions 132 of the gripping arms 20, 22 to move toward each other to clamp against the workpiece 12.

As shown in FIG. 9, to move the position in which the gripping fingers 118, 119 will grip the workpiece 12 in a third direction D3 (e.g., in a direction opposite the first direction D1 along the longitudinal axis A1) toward the first and second outer plates 14, 16, the user may rotate the first adjustment rod 96 in a direction that causes movement of the first guide member 58 within the guide-member recess 48 toward the wall 106 in a fourth direction D4 perpendicular to the longitudinal axis A1. Movement of the first guide member 58 in the fourth direction D4 causes the second guide member 60 to move within the guide-member recess 48 relative to the guide channels 44, 46 in the third direction D3. By moving the second guide member 60 in the third direction D3, the position along the guide channels 44, 46 at which the bushings 140, 142 will contact the surfaces 74, 78 of the second guide member 60 will be moved in the third direction D3, thereby causing the bushings 140, 142 to contact surfaces 74, 78 sooner along the stroke of the central plate 18 (i.e., at a location closer to the housing 144). In this manner, the gripping fingers 118, 119 will grip the workpiece 12 in a position closer to the first and second outer plates 14, 16.

As shown in FIG. 10, to move the position in which the gripping fingers 118, 119 will grip the workpiece 12 in a fifth direction D5 (e.g., in a vertical direction perpendicular to the longitudinal axis A1), the user may rotate the second adjustment rod 98 in a direction that causes movement of the second guide member 60 within the guide-member recess 48 away from the wall 106 in the second direction D2 perpendicular to the longitudinal axis A1. Such movement of the second guide member 60 lengthens the path along the first leg 50 of the first guide channel 44 that the bushing 142 must travel to contact the first surface 74 of the second guide member 60. This movement of the second guide member 60 also shortens the path along the first leg 50 of the second guide channel 46 that the bushing 140 must travel to contact the third surface 78 of the second guide member 60.

Therefore, by moving the second guide member 60 in the second direction D2, the bushing 140 of the first gripping arm 20 will begin traveling along the second leg 52 of the second guide channel 46 sooner than the bushing 142 of the second gripping arm 22 begins travelling along the second leg 52 of the first guide channel 44. Therefore, the portion 132 of the first gripping arm 20 (i.e., the portion with the gripping finger 119) will move a greater distance laterally (perpendicular to the longitudinal axis A1) toward the workpiece 12 than the distance that the portion 132 of the second gripping arm 22 will move laterally toward the workpiece 12. As a result, the workpiece 12 will be clamped by the gripping fingers 119 at a location vertically lower in the fifth direction D5.

As shown in FIG. 11, to move the position in which the gripping fingers 118, 119 will grip the workpiece 12 in a sixth direction D6 (e.g., in a vertical direction opposite the fifth direction D5), the user may rotate the second adjustment rod 98 in a direction that causes movement of the second guide member 60 within the guide-member recess 48 toward the wall 106 in the fourth direction D4 perpendicular to the longitudinal axis A1. Such movement of the second guide member 60 lengthens the path along the first leg 50 of the second guide channel 46 that the bushing 140 must travel to contact the third surface 78 of the second guide member 60. This movement of the second guide member 60 also shortens the path along the first leg 50 of the first guide channel 44 that the bushing 142 must travel to contact the first surface 74 of the second guide member 60.

Therefore, by moving the second guide member 60 in the fourth direction D4, the bushing 142 of the second gripping arm 22 will begin traveling along the second leg 52 of the first guide channel 44 sooner than the bushing 140 of the first gripping arm 20 begins travelling along the second leg 52 of the second guide channel 46. Therefore, the portion 132 of the second gripping arm 22 (i.e., the portion with the gripping finger 119) will move a greater distance laterally (perpendicular to the longitudinal axis A1) toward the workpiece 12 than the distance that the portion 132 of the first gripping arm 20 will move laterally toward the workpiece 12. As a result, the workpiece 12 will be clamped by the gripping fingers 119 at a location vertically higher in the sixth direction D6.

The fixture mechanism 10 shown in the figures may be used to hold the workpiece 12 for a grinding operation. It will be appreciated, however, that the principles of the present disclosure may be applicable to fixture mechanisms configured for turning operations and/or other machining or manufacturing operations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fixture mechanism for holding a workpiece, the fixture mechanism comprising:
 a first outer plate and a second outer plate cooperating to form a cavity therebetween, the second outer plate including a first face facing the first outer plate, the second outer plate including first and second guide channels and a guide-member recess formed into the first face and exposed to the cavity, the first and second guide channels being fixed relative to the first outer plate;
 a central plate disposed within the cavity and directly slidably engaging the first and second outer plates, the central plate slidably engaging first and second gripping arms, the gripping arms being movable relative to the first and second outer plates between a clamped position and a retracted position; and
 a first guide member and a second guide member received in the guide-member recess and directly contacting each other, the first and second guide members being movable relative to the second outer plate and relative to each other within the guide-member recess to adjust a position relative to the first and second outer plates at which the workpiece will be clamped when the first and second gripping arms are in the clamped position.

2. The fixture mechanism of claim 1, further comprising first and second adjustment members threadably received in first and second apertures, respectively, of the second outer plate and extending into the guide-member recess, the first adjustment member abutting the first guide member and rotatable relative to the second outer plate to adjust a position of the first guide member within the guide-member recess, the second adjustment member abutting the second guide member and rotatable relative to the second outer plate to adjust a position of the second guide member within the guide-member recess.

3. The fixture mechanism of claim 2, further comprising first and second springs biasing the first and second guide members into contact with the first and second adjustment members.

4. The fixture mechanism of claim 3, further comprising a third spring extending into the guide-member recess and biasing the second guide member toward the first guide member.

5. The fixture mechanism of claim 4, wherein the first and second guide members, the first, second and third springs, and the first and second adjustment members are the only components disposed within the guide-member recess.

6. The fixture mechanism of claim 4, further comprising a rod received in a third aperture extending through the second outer plate, wherein the third spring is at least partially received in the aperture and abuts an axial end of the rod.

7. The fixture mechanism of claim 1, wherein the first guide member includes a flat first side and a flat second side opposing side, the first side extending at a non-perpendicular angle relative to the second side, the first side slidably abutting a flat wall of the guide-member recess.

8. The fixture mechanism of claim 7, wherein the wall of the guide-member recess and the first side of the first guide member are disposed at a non-perpendicular angle relative to an axis along which the central plate moves relative to the first and second outer plates.

9. The fixture mechanism of claim 8, wherein the second guide member includes a first side and a second side opposite the first side, the first side of the second guide member slidably abutting the second side of the first guide member, the second side of the second guide member including first, second and third surfaces, the first and third surfaces being flat and angled relative to each other and relative to the axis, the second surface disposed between the first and third surfaces.

10. The fixture mechanism of claim 9, wherein the first and second gripping arms include pins extending therefrom and slidably received in the first and second guide channels, wherein the pins contact the first and third surfaces of the of the second guide member along a portion of range of motion of the pins.

11. The fixture mechanism of claim 1, wherein the first and second gripping arms include first and second pins, respectively, the first and second pins having bushings that are movably received in the first and second guide channels, wherein distal ends of the first and second pins are received in recesses formed in the first and second guide channels.

12. The fixture mechanism of claim 1, wherein the guide-member recess is in communication with the first and second guide channels.

13. A fixture mechanism comprising:
a first outer plate and a second outer plate cooperating to form a cavity therebetween, the second outer plate including a first face facing the first outer plate, the second outer plate including first and second guide channels and a guide-member recess formed into the first face and exposed to the cavity;
a central plate disposed within the cavity and slidably receiving first and second gripping arms, the gripping arms being movable relative to the first and second outer plates between a clamped position and a retracted position, the gripping arms including pins extending therefrom and movably received in the guide channels; and
a first guide member and a second guide member received in the guide-member recess and directly contacting each other, the first and second guide members being movable relative to the second outer plate and relative to each other within the guide-member recess, the second guide member directly contacting the pins of the gripping arms during a portion of the range of motion of the gripping arms and guiding the gripping arms to the clamped position.

14. The fixture mechanism of claim 13, wherein the pins include bushings that directly contact the second guide member.

15. The fixture mechanism of claim 13, wherein movement of the first and second guide members relative to the second outer plate adjusts a position relative to the first and second outer plates at which a workpiece will be clamped when the first and second gripping arms are in the clamped position.

16. The fixture mechanism of claim 13, further comprising first and second adjustment members threadably received in first and second apertures, respectively, of the second outer plate and extending into the guide-member recess, the first adjustment member abutting the first guide member and rotatable relative to the second outer plate to adjust a position of the first guide member within the guide-member recess, the second adjustment member abutting the second guide member and rotatable relative to the second outer plate to adjust a position of the second guide member within the guide-member recess.

17. The fixture mechanism of claim 16, further comprising first and second springs biasing the first and second guide members into contact with the first and second adjustment members.

18. The fixture mechanism of claim 17, further comprising a third spring extending into the guide-member recess and biasing the second guide member toward the first guide member.

19. The fixture mechanism of claim 18, wherein the first and second guide members, the first, second and third springs, and the first and second adjustment members are the only components disposed within the guide-member recess.

20. The fixture mechanism of claim 18, further comprising a rod received in a third aperture extending through the second outer plate, wherein the third spring is at least partially received in the aperture and abuts an axial end of the rod.

21. The fixture mechanism of claim 13, wherein the first guide member includes a flat first side and a flat second side opposing side, the first side extending at a non-perpendicular angle relative to the second side, the first side slidably abutting a flat wall of the guide-member recess.

22. The fixture mechanism of claim 21, wherein the wall of the guide-member recess and the first side of the first guide member are disposed at a non-perpendicular angle relative to an axis along which the central plate moves relative to the first and second outer plates.

23. The fixture mechanism of claim 22, wherein the second guide member includes a first side and a second side opposite the first side, the first side of the second guide member slidably abutting the second side of the first guide member, the second side of the second guide member including first, second and third surfaces, the first and third surfaces being flat and angled relative to each other and relative to the axis, the second surface disposed between the first and third surfaces.

24. The fixture mechanism of claim 23, wherein the pins contact the first and third surfaces of the of the second guide member along a portion of range of motion of the pins.

25. The fixture mechanism of claim 24, wherein the first and second guide channels are fixed relative to the first outer plate.

26. The fixture mechanism of claim 13, wherein the first and second pins include bushings that are movably received in the first and second guide channels, and wherein distal ends of the first and second pins are received in recesses formed in the first and second guide channels.

27. The fixture mechanism of claim 13, wherein the guide-member recess is in communication with the first and second guide channels.

* * * * *